United States Patent
Reed

(10) Patent No.: US 9,248,373 B2
(45) Date of Patent: Feb. 2, 2016

(54) SYSTEM AND METHOD FOR CONNECTING GAMING USERS IN A SOCIAL NETWORK ENVIRONMENT

(75) Inventor: Albert J. Reed, Jamaica Plain, MA (US)

(73) Assignee: Demiurge Studios, Inc., Cambridge, MA (US)

(*) Notice: Subject to any disclaimer, the term of this patent is extended or adjusted under 35 U.S.C. 154(b) by 105 days.

(21) Appl. No.: 13/488,047

(22) Filed: Jun. 4, 2012

(65) Prior Publication Data

US 2013/0090170 A1    Apr. 11, 2013

Related U.S. Application Data

(60) Provisional application No. 61/543,636, filed on Oct. 5, 2011.

(51) Int. Cl.
A63F 13/30    (2014.01)

(52) U.S. Cl.
CPC .......... *A63F 13/12* (2013.01); *A63F 2300/5566* (2013.01); *A63F 2300/572* (2013.01)

(58) Field of Classification Search
USPC .......................................................... 463/42
See application file for complete search history.

(56) References Cited

U.S. PATENT DOCUMENTS

| | | | | |
|---|---|---|---|---|
| 2007/0055728 A1* | 3/2007 | Shea | ....................... | A63F 13/12 709/204 |
| 2007/0218997 A1* | 9/2007 | Cho | ....................... | A63F 13/12 463/42 |
| 2008/0227553 A1 | 9/2008 | Leifenberg et al. | | |
| 2009/0062012 A1 | 3/2009 | Yang et al. | | |
| 2009/0254358 A1* | 10/2009 | Li et al. | ............................. | 705/1 |
| 2010/0035689 A1 | 2/2010 | Altshuler et al. | | |
| 2010/0062840 A1 | 3/2010 | Herrmann | | |
| 2010/0174593 A1 | 7/2010 | Cao et al. | | |
| 2011/0183732 A1* | 7/2011 | Block | .................... | G06Q 30/02 463/1 |
| 2011/0270931 A1* | 11/2011 | Cheng et al. | .................. | 709/206 |
| 2012/0184363 A1* | 7/2012 | Barclay et al. | .................. | 463/25 |
| 2012/0226912 A1* | 9/2012 | King | ............................. | 713/183 |

OTHER PUBLICATIONS

International Search Report for International Application PCT/US2012/40751, dated Aug. 13, 2012.
International Preliminary Report on Patentability for International Application PCT/US2012/040751, dated Apr. 8, 2014.

* cited by examiner

*Primary Examiner* — Jason Yen
(74) *Attorney, Agent, or Firm* — Sean D. Detweiler, Esq.; Morse, Barnes-Brown & Pendleton P.C.

(57) ABSTRACT

A computer implemented method includes receiving, through at least one input device, an indication of an activity by a first user on a first gaming user account from a first computer implemented gaming system. A communication can be sent to a computer implemented social network system causing the computer implemented social network system to display a notification based on the indication of the activity by the first user in the first computer implemented gaming system. The communication can include information enabling the computer implemented social network system to affiliate the indication of the activity by the first user with a first social network user account belonging to the first user. The first gaming user account and the first social network user account can be different user accounts.

18 Claims, 14 Drawing Sheets

| 210 | 212 | 214 | 216 |
|---|---|---|---|
| User A | Facebook account name 1 | Gaming account name 1 for game 1 | Gaming account name 1 for game 2 |
| User B | Facebook account name 2 | Gaming account name 2 for game 1 | Gaming account name 2 for game 2 |
| User C | Facebook account name 3 | Gaming account name 3 for game 1 | Gaming account name 3 for game 2 |

*FIG. 2*

SYSTEM AND METHOD FOR CONNECTING GAMING USERS IN A SOCIAL NETWORK ENVIRONMENT

RELATED APPLICATIONS

This application claims priority to, and the benefit of, U.S. Provisional Application No. 61/543,636, filed Oct. 5, 2011, for all subject matter common to both applications. The disclosure of said application is hereby incorporated by reference in its entirety.

FIELD OF THE INVENTION

The present invention relates to computer implemented systems and methods for collaborating between social network systems and one or more gaming systems. More particularly, the present invention relates to systems and methods for connecting social network users to members of other gaming communities within the social network environment.

BACKGROUND OF THE INVENTION

Many existing online communities of users (e.g., gaming communities) are hosted by a third-party system that is separate from social network systems. As a result, such third-party systems are unable to access features of and resources utilized within specific social network systems. This can also be due to a variety of additional reasons, including technical and practical barriers that exist between these types of disparate communities. For example, discrepancies often exist between a user's social network account name and the user's account names used on other third-party websites (e.g., gaming websites). This greatly hinders the ability to relay of information about the user's different other communities within the social network information about the user's different other communities within the social network environment. Accordingly, for individuals who are active both in a social network and other internet communities (e.g., online gaming communities), dispersal of information across communities remains a significant challenge that has not been overcome. This lack of sharing of information limits the effectiveness of such social network systems, and also prevents effective marketing campaigns, such as advertising by a third-party system on a social network system that targets social network friends of gaming users that are also users of the advertised service. Stated differently, in the context of gaming communities, it is presently impossible for third-party gaming communities and systems to continue their discussions, advertisements, and services within the environment and context of an independent social network system. Accordingly, users of a particular third-party gaming system currently are unable to connect with one another through an independent social network system.

SUMMARY

Thus, there is a need for a system that better connects gaming users within a social network environment. Furthermore, there exits a need for a system capable of adequately utilizing social network marketing tools made available through status updates, news feeds, and other mechanisms for sharing or advertising information. The present invention is directed toward further solutions to address these and other needs, in addition to having other desirable characteristics that will be appreciated by one of skill in the art upon reading the present specification.

In accordance with one example embodiment of the present invention, a computer implemented method can include receiving, through at least one input device, an indication of an activity by a first user on a first gaming user account from a first computer implemented gaming system. A communication can be sent to a computer implemented social network system causing the computer implemented social network system to display a notification based on the indication of the activity by the first user in the first computer implemented gaming system. The communication can include information enabling the computer implemented social network system to affiliate the indication of the activity by the first user with a first social network user account belonging to the first user. The first gaming user account and the first social network user account can be different user accounts.

In accordance with further embodiments of the present invention, the activity by the first user can include one or more of: joining a multiplayer game, exiting a multiplayer game, or moving to a different virtual location in a multiplayer game. The activity by the first user can include joining a multiplayer game or moving to a different virtual location. The method further can include receiving from the computer implemented gaming system, through at least one input device, a first virtual location of the first user on the first gaming user account. A link can be generated that enables an additional user to join the multiplayer game at the first virtual location. The communication to the computer implemented social network system further can cause the notification to include the link.

In accordance with further embodiments of the present invention, a request can be received that was submitted by a second user viewing the notification on a second social network user account belonging to the second user to join the multiplayer game at the first virtual location. Based on the received request, an application can be launched in a website hosted by the computer implemented social network system, and the application can enable the second user to join the multiplayer game at the first virtual location by accessing one or more websites hosted by the computer implemented gaming system. The application can stream one or more multiplayer games hosted by the computer implemented gaming system to a website hosted by the computer implemented social network system.

In accordance with further embodiments of the present invention, the method further can include identifying, based on the received activity indication, the first social network user account prior to the step of sending a communication. The first social network user account belonging to the first user can be identified by (e.g., according to) the social network user account name, a user ID, or a user authentication tag. The step of identifying the first social network user account can include retrieving the first social network user account from at least one database. The at least one database can contains, for each user of a plurality of users, a social network user account belonging to the user and at least one gaming user account belonging to the user, and the plurality of users can include the first user. A corresponding gaming user account name can be received from each of one or more users on one or more corresponding social network user accounts, and the corresponding gaming user account name for each of the one or more users can be stored in a database. The notification can be displayed to a second user on a second social network user account belonging to the second user, wherein the first user and the second user are linked as social network friends in the computer implemented social network system.

In accordance with another example embodiment of the present invention, a non-transitory computer readable storage device can contain instructions stored thereon, and execution of the instructions by at least one processor can cause a method to occur. The method can include sending a communication to a computer implemented social network system causing the computer implemented social network system to display a notification, and the step of sending the communication can be based on an indication of an activity by a first gaming user account associated with a first user in a first computer implemented gaming system. The indication can be received by the first computer implemented gaming system. The communication can include information enabling the computer implemented social network system to affiliate the indication of the activity by the first user with a first social network user account belonging to the first user. The first gaming user account and the first social network user account can be different user accounts.

In accordance with further embodiments of the present invention, the activity by the first user can include one or more of: joining a multiplayer game, exiting a multiplayer game, or moving to a different virtual location in a multiplayer game. The activity by the first user can include joining a multiplayer game or moving to a different virtual location. The method further can include generating a link enabling an additional user to join the multiplayer game at the first virtual location. The link can be based on a first virtual location of the first user on the first gaming user account, and the indication can be received from the first computer implemented gaming system. The communication to the computer implemented social network system can cause the notification to include the link.

In accordance with further embodiments of the present invention, the method can include causing an application to launch in a website hosted by the computer implemented social network system. The application can enable a second user viewing the notification on a second social network user account belonging to the second user to join the multiplayer game at the first virtual location, e.g., by accessing one or more websites hosted by the computer implemented gaming system. The application can stream one or more multiplayer games hosted by the computer implemented gaming system to a website hosted by the computer implemented social network system.

In accordance with further embodiments of the present invention, the method further can include identifying, based on the received activity indication, the first social network user account prior to the step of sending a communication. The first social network user account belonging to the first user can be identified by the social network user account name, a user ID, or a user authentication tag. The step of identifying the first social network user account can include retrieving the first social network user account from at least one database. The at least one database can contain, for each user of a plurality of users, a social network user account belonging to the user and at least one gaming user account belonging to the user. The plurality of users can include the first user. The method further can include storing, in a database, a corresponding gaming user account name for each of one or more users each having a social network user account. The step of storing the corresponding gaming user account name can be based on receiving the corresponding gaming user account name from each of the one or more users on one or more corresponding social network user accounts. The notification can be displayed to a second user on a second social network user account belonging to the second user. The first user and the second user can be linked as social network friends in the computer implemented social network system.

In accordance with another example embodiment of the present invention, a computer system including at least one processor, at least one output device, at least one input device, and at least one non-transitory computer readable storage device can be configured to perform a method. The method can include receiving, through the at least one input device, an indication of an activity by a first user on a first gaming user account from a first computer implemented gaming system. Based on the indication of the activity by the first user in the first computer implemented gaming system, the at least one processor can be caused to execute one or more instructions stored on the at least one non-transitory computer readable storage device, thereby causing a communication to be sent through the at least one output device to a computer implemented social network system causing the computer implemented social network system to display a notification. The communication can include information enabling the computer implemented social network system to affiliate the indication of the activity by the first user with a first social network user account belonging to the first user. The first gaming user account and the first social network user account can be different user accounts.

In accordance with further embodiments of the present invention, the activity by the first user can include one or more of: joining a multiplayer game, exiting a multiplayer game, or moving to a different virtual location in a multiplayer game. The activity by the first user can include joining a multiplayer game or moving to a different virtual location, and the method further can include: receiving from the computer implemented gaming system, through at least one input device, a first virtual location of the first user on the first gaming user account; and generating a link enabling an additional user to join the multiplayer game at the first virtual location. The communication to the computer implemented social network system further can cause the notification to include the link.

In accordance with further example embodiments of the present invention, the method further can include receiving a request submitted by a second user viewing the notification on a second social network user account belonging to the second user to join the multiplayer game at the first virtual location, and causing an application to launch in a website hosted by the computer implemented social network system, the application enabling the second user to join the multiplayer game at the first virtual location by accessing one or more websites hosted by the computer implemented gaming system. The application can be configured to stream, using the at least one processor, one or more multiplayer games hosted by the computer implemented gaming system to a website hosted by the computer implemented social network system.

In accordance with further example embodiments of the present invention, the method further can include identifying, based on the received activity indication, the first social network user account prior to the step of sending a communication. The computer implemented system can be configured to identify the first social network user account belonging to the first user by a social network user account name, a user ID, or a user authentication tag. The step of identifying the first social network user account can include retrieving the first social network user account from at least one database. The at least one database can contain, for each user of a plurality of users, a social network user account belonging to the user and at least one gaming user account belonging to the user. The plurality of users can include the first user. The method further can include receiving a corresponding gaming user account name from each of one or more users on one or more corresponding social network user accounts, and storing the corresponding gaming user account name for each of the one or more users in a database.

BRIEF DESCRIPTION OF THE FIGURES

These and other characteristics of the present invention will be more fully understood by reference to the following detailed description in conjunction with the attached drawings, in which:

FIG. 2 is a diagrammatic representation of a plurality of entries in an accounts database, according to aspects of the present invention;

DETAILED DESCRIPTION

Figure 1:
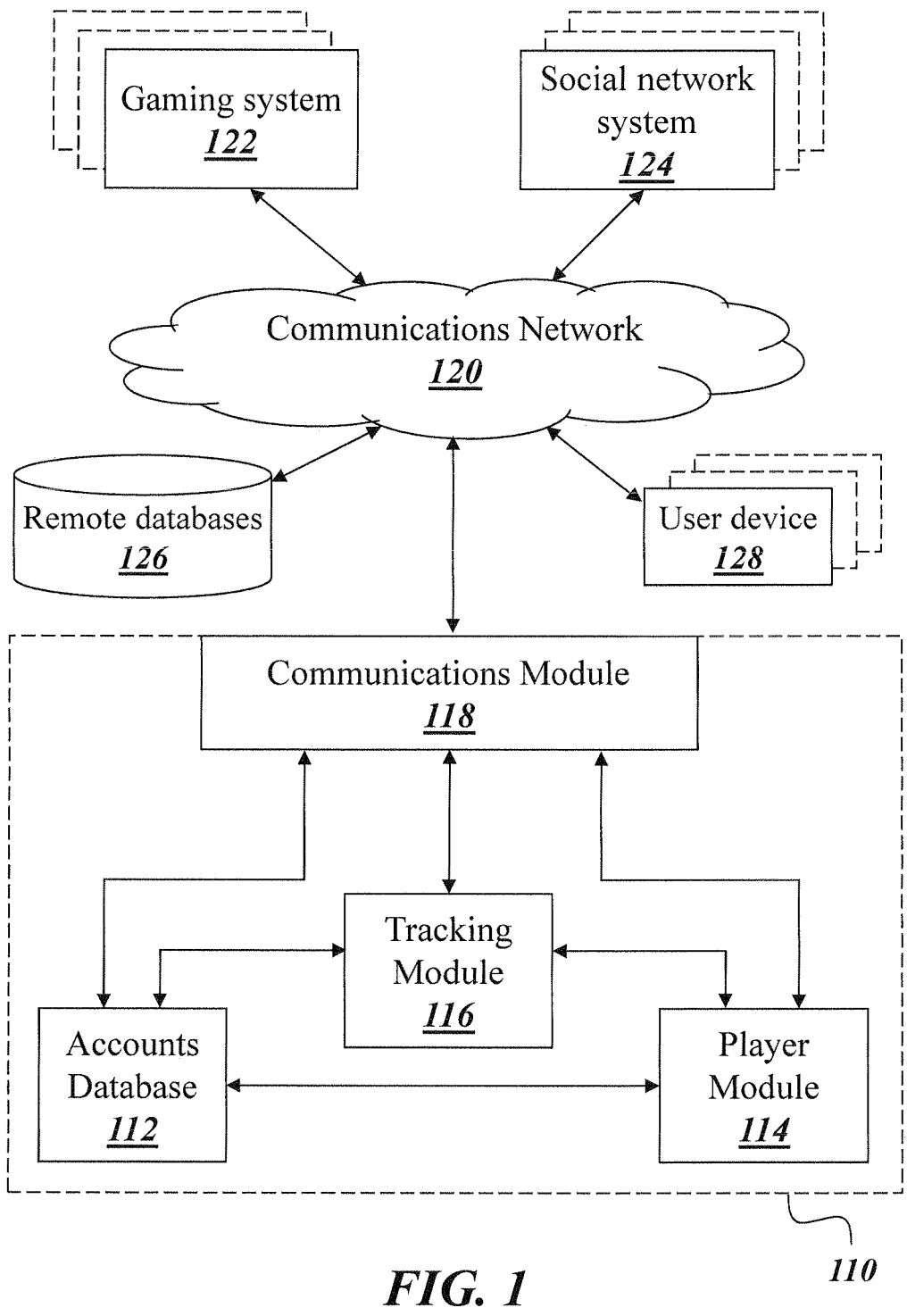
FIG. 1 is a schematic block diagram illustrating an example system for implementing one or more of the functions and features of embodiments of the present invention.

An illustrative embodiment of the present invention relates to a system for enabling social network users with accounts on independent gaming system(s) to connect with their social network friends who are also "garners" in the independent gaming system(s). The system also enables social network users with accounts on independent gaming system(s) to share information about their gaming activity with their social network friends. In particular, the system collects information about the activity of social network users on third-party gaming systems (e.g., websites) acting under different gaming account names. The system additionally provides information to a social network system that enables the creation of social network notifications to be displayed to users through their social network accounts. The created social network notifications can provide social network users with updates regarding their social network friends, e.g., indicating that one or more of their social network friends are playing one or more multiplayer games (e.g., multiplayer games adapted for synchronous, simultaneous game play by multiple users). Furthermore, the system provides mechanisms that enable a plurality of different multiplayer games provided by different third-party gaming systems that are independent of the social network system to be streamed to the social network page, thereby enabling social network users to join their friends in multiplayer games without requiring the social network users to leave the social network website, and without requiring social network users to know their friends' gaming account names (e.g., gaming handles). In this way, social network users can be enabled to initiate synchronous simultaneous gameplay with their social network friends (or other social network connections) in third-party multiplayer games adapted for synchronous, simultaneous gameplay by multiple users, but which require separate gaming user accounts that are different from the users' social network user accounts.

FIGS. 1 through 11, wherein like parts are designated by like reference numerals throughout, illustrate example systems and methods for connecting social network users with their corresponding friends that are actively engaging in a multiplayer game (e.g., adapted for synchronous, simultaneous game play by multiple users) hosted by a computer implemented gaming system that is different from the computer implemented social network system, according to illustrative embodiments of the present invention. Although the present invention will be described with reference to the example embodiments illustrated in the figures, it should be understood that many alternative forms can embody the present invention. One of skill in the art will appreciate different ways to alter the parameters of the embodiments disclosed, such as the order of steps, manner of displaying and presenting various features, as well as others, in a manner still in keeping with the spirit and scope of the present invention.

FIG. 1 depicts an example system 110 for implementing one or more of the functions and methods described herein, according to an embodiment of the present invention. The system 110 can include an accounts database 112 for storing information about various different accounts for each of a plurality of users to whom the accounts belong. The system 110 also can include a player module 114 configured to enable one or more different multiplayer games (e.g., adapted for synchronous, simultaneous game play by multiple users) to be streamed from a computer implemented gaming system to a computer implemented social network system. For example, the player module 114 can be configured to stream at least two different multiplayer games that are hosted by two different remote computer implemented gaming systems 122 (e.g., remote gaming servers). The system 110 additionally can include a tracking module 116 configured to track current and optionally past gaming activity of gaming users as received from one or more remote computer implemented gaming systems 122 (e.g., remote gaming servers). The system 110 also can include a communications module 118 configured to connect to a communications network 120 (e.g., the Internet) for allowing the system 110 to communicate with: one or more computer implemented gaming systems 122, a computer implemented social network system 124, one or more remote databases 126, and one or more user devices 128. For example, the gaming systems 122, the social network system 124, and the user devices 128 can all be remote from the system 110.

One of skill in the art will appreciate a wide variety of ways to modify and alter the system 110 of FIG. 1, as well as the various components with which it interacts. For example, the accounts database 112 can be implemented according to any number of suitable database structures. Furthermore, some or all of the information contained in the accounts database 112 alternatively can be stored in one or more of the remote databases 126. In addition, all or some of the accounts database 112 can be included in one or more databases provided by the social network system 124, e.g., along with other components and modules depicted as included in the system 110 in the example embodiment of FIG. 1. Although the components and modules are depicted as discrete blocks and elements, in fact the system 110 may be implemented in such a way that multiple of the depicted modules are implemented with just one such module. Similarly, in some embodiments it may be desirable to implement the system 110 using multiple iterations of the depicted modules and/or components, as would be appreciated by one of skill in the art.

Furthermore, while some modules and components are depicted as included within the system 110, it should be understood that, in fact, any of the depicted modules alternatively can be excluded from the system 110 and included in a different system. For example, in some embodiments, the player module 114 and/or the tracking module 116 are included in the gaming system 122 and/or the social network system 124. In some embodiments, the player module 114 can be implemented as an application that is stored locally on the individual user devices 128. Similarly, in some alternative embodiments, the accounts database 112 can be implemented as a virtual database, e.g., connecting information stored locally on a plurality of remote devices (such as the user devices 128, optionally). In some embodiments, the accounts database 112 can be included in the social network system 124, as described previously herein, in either a single database or spread throughout multiple different databases. One of skill in the art will appreciate a variety of other ways to expand, reduce, or otherwise modify the system 110 upon reading the present specification.

In general, the accounts database 112 can store a variety of different account information for a plurality of different users represented in the accounts database 112. In illustrative embodiments, for each represented user, the accounts database 112 includes a social network account name belonging to the user. Thus, in embodiments adapted for a social network site, Facebook® (headquartered in Menlo Park, Calif.), the accounts database 112 contains a Facebook® account name for each user represented in the accounts database 112. The accounts database 112 further includes at least one gaming account name for each of the users represented therein. The at least one gaming account name need not correspond to the same multiplayer game or the same gaming system 122 for every user represented in the accounts database 112. As previously described herein, the accounts database 112 can be implemented in the system 110 by more than one database.

In general, the accounts database 112 includes information that effectively links, for a plurality of different users, each user's social network account name with one or more gaming account names also belonging to the user. The accounts database 112 thus can be created, organized, structured, and maintained in any way suitable to produce such a repository of information "linking" various users different account names. For instance (and as described later herein with reference to FIG. 5A), information in the accounts database 112 can be collected by providing social network users with one or more registration forms (e.g., in the social network environment). The registration forms can allow social network users to submit their corresponding gaming account names and information, and this data can be automatically stored in the accounts database 112, thereby building the repository of information described and referred to herein. However, the accounts database 112 is not so limited to such mechanisms of information collection. Rather, other ways of collecting and storing information pertaining to users' various different account names are possible and contemplated within the scope of the present invention.

FIG. 2 depicts example structures for database entries in the accounts database 112. In the depicted example embodiment, the accounts database 112 includes, for each one of three different users, a user ID 210, a social network account name 212, a gaming account name for a first multiplayer game 214 (e.g., which is adapted for synchronous, simultaneous game play by multiple users), and a gaming account name for a second multiplayer game 216 (e.g., which is adapted for synchronous, simultaneous game play by multiple users). While each of the three users has a gaming account for both the first multiplayer game and the second multiplayer game, it is also possible for the accounts database 112 to include gaming account names corresponding to different multiplayer games for different users. Furthermore, it is possible for some users represented in the accounts database 112 to have more or less gaming account names in the accounts database 112 than other users represented in the accounts database 112, as previously described herein.

Alternatively or additionally to providing gaming account names associated with a particular multiplayer game, it is also possible for the accounts database 112 to include gaming account names associated with various gaming systems 122. For example, if a single gaming website offers users a plurality of different multiplayer games all using a single gaming account, then this could be stored as such in the accounts database 112. One of skill in the art will appreciate that the example database entries of FIG. 2 are not limiting and are provided merely for purposes of illustration. Many different forms, types, and structures for entries in the accounts database 112 as well as for the accounts database 112 itself are possible and contemplated within the scope of the present invention.

In general, it is typical of gaming systems 122 create and send out "activity updates" about its users. These activity updates can include a wide variety of information, such as: (a) a list (or other plurality) of newly active user, (b) a list (or other plurality) of newly inactive users, and/or (c) a list (or other plurality) of existing active users. The list of "newly active users" includes identification of users that have recently logged into, recently signed into, or otherwise recently joined particular multiplayer games (e.g., multiplayer games adapted for synchronous, simultaneous game play by multiple users). The list of "newly inactive users" include users that were previously active (i.e., were previously logged into or had joined) particular multiplayer games but have recently logged out of, recently signed out of, or otherwise recently exited the particular multiplayer games that they previously had joined. The plurality of "existing active users" include users that have previously joined particular multiplayer games and are still in the particular multiplayer games (i.e., have not yet exited the particular multiplayer games). Some gaming systems 122 only provide existing active users in order to indicate a status change, e.g., to indicate that a user (which was previously reported as "newly active") has moved up into a new level or stage of a particular multiplayer game.

One of skill in the art will appreciate that while reference is made to "lists" throughout the present disclosure, the plurality of gaming account names need to not be supplied or received in this form. Rather, there are a wide variety of suitable ways to structure and transmit this data. All such variations are contemplated within the scope of the present invention. Typically, the activity updates that are created by gaming systems 122 identify gaming users by their gaming account names (e.g., user handles, user IDs, etc.) that are currently in particular multiplayer games.

In general, for multiplayer games adapted for synchronous, simultaneous game play by multiple users, the "activity updates" created by gaming systems 122 also typically include information about the specific virtual location of each listed active user (e.g., each newly active user and each existing active user) within the particular multiplayer game in which that active user is involved. For instance, some multiplayer games provide a plurality of different "rooms," "levels," "stages," etc. through which users may progress as they advance in the multiplayer game. (E.g., some multiplayer games require users to complete particular objectives, and upon completing a particular objective, the users are caused to move to a higher "level" or other virtual location within the game.) Thus, for such multiplayer games, the users' virtual locations depend upon the particular "room," "level," "stage," etc. in which the users can be found.

Furthermore, for multiplayer games adapted for nonsynchronous gameplay by multiple users, particular instantiations of such a multiplayer game between two or more gaming users can be identified by a "virtual location." For example, such virtual locations can be useful in distinguishing between a first instantiation of the multiplayer game that is being played between "Joe" and "Bill" and a second instantiation of the multiplayer game that is being played between "Erin" and "Laura."

One of skill in the art will appreciate that the particular format of the information about gaming users' virtual locations is dictated by the particular gaming system 122 or even by the particular multiplayer game. For instance, if a multiplayer game does not provide any such plurality of different virtual locations through which users progress as they advance in the game (or if a multiplayer game only provides one virtual location for all users playing the multiplayer game), then simply identifying the name of such a multiplayer game may be sufficient to identify the user's specific virtual location. In such instances, the name of the multiplayer game may serve as sufficient information for determining the specific virtual location. Alternatively, in other multiplayer games that do provide such a plurality of virtual locations, the particular "room," "level," or "stage" (or other information about the virtual location) may be required in order to identify active users' precise virtual locations in those games.

Figure 3:
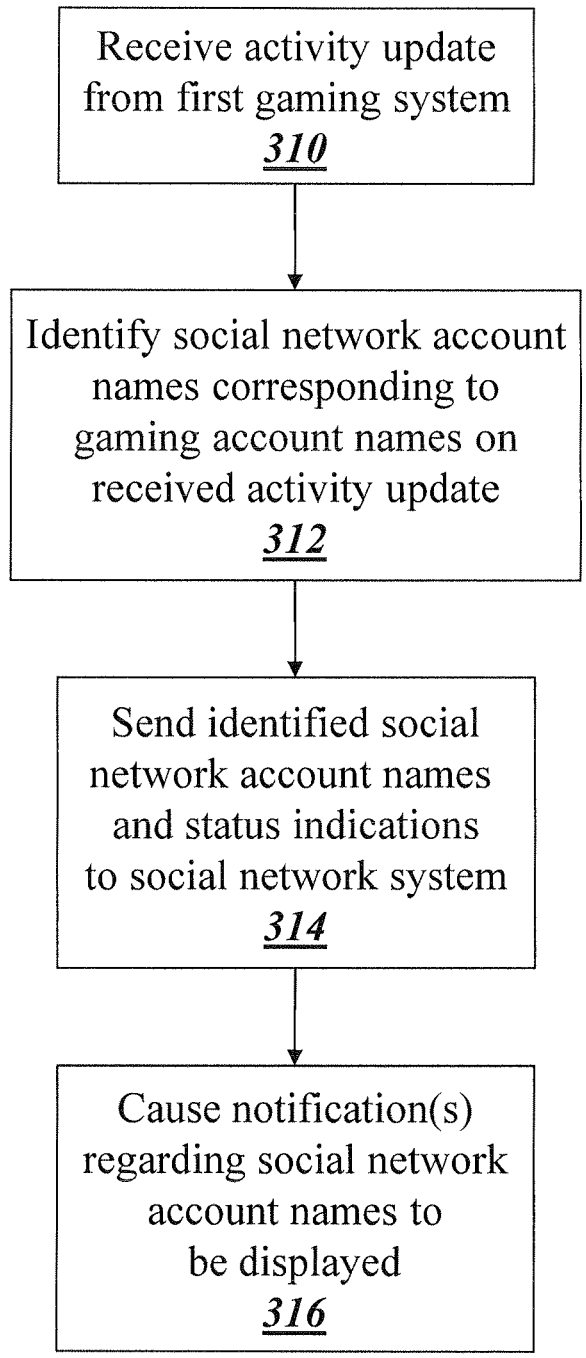
FIG. 3 is a flow chart depicting an example method for displaying notification to social network users, according to aspects of the present invention.

FIG. 3 depicts a method according to an example embodiment of the present invention for using activity updates received from gaming systems 122 to cause a social network system 124 to display one or more notifications enabling dissemination of information about social network users' activity on the gaming systems 122, thereby enabling social network users with gaming accounts to connect with one another without any knowledge of each others' gaming account names. The system 110 can receive an activity update from a first gaming system 122 about users playing one or more particular games hosted by the first gaming system 122 (step 310). More specifically, the activity update can include one or more active gaming account names (e.g., existing active gaming account names and/or newly active gaming account names) and/or one or more recently inactive gaming account names. Furthermore, if the received activity updated includes one or more active gaming account names, the activity update further can include a corresponding virtual location of each of one or more of the active gaming account names.

The system 110 can use the received gaming account names to identify corresponding social network accounts (e.g., by account name, by account ID, by a user authentication tag, etc.) belonging to users who have gaming accounts appearing in the activity update (step 312). For example, the system 110 can identify the corresponding social network accounts for: only newly active gaming account names in the activity update, only existing active gaming account names in the activity update, only newly inactive gaming account names in the activity update, or some combination thereof (e.g., only newly active gaming account names and newly inactive gaming account names in the activity updated). In some illustrative embodiments, step 312 includes identifying one or more social network accounts names corresponding to one or more of the newly active gaming user accounts and/or one or more newly inactive gaming user accounts in the activity update, but not identifying any one or more social network account names corresponding to one or more of the existing active gaming accounts.

As one example, step 312 can be performed by the tracker module 116 using at least one processor to execute the following functions: (a) automatically identifying any newly active gaming account names included in the received activity update; (b) automatically generating a search query for each of the identified newly active gaming account names, (c) automatically executing each generated search query against the accounts database 112 in order to search for a matching gaming account name, and (d) retrieving, from the accounts database 112, the social network account name (or other suitable social network account identifier) corresponding to each matched gaming account name. In this manner, the system 110 can use the received activity update comprising one or more newly active gaming account names to identify one or more corresponding social network accounts (e.g., by name, by user ID, by a user authentication tag, or using any other suitable social network account identifiers) that are newly active in a particular multiplayer game.

Before proceeding to step 314, the system 110 optionally can perform any number of data aggregation, sorting, filtering, selection, or other data processing functions, as would be appreciated by one of skill in the art. For example, in some embodiments the system 110 can randomly select one or more of the retrieved social network account names for use in the remainder of the process of FIG. 3. Furthermore, the system 110 optionally can organize the plurality of retrieved social network account names into groups based on links (e.g., friendship connections, etc.) in the social network between the retrieved social network account names. The system 110 further can create one or more tags or metadata associated with one or more of the retrieved social network account names. For example, the system 110 can create a time-based tag (or other record or log entry, e.g.) for each of the plurality of social network account names identified in step 312. This can, e.g., enable the tracking module 116 to track activity levels of social network account names with respect to particular games. As will be appreciated by one of skill in the art upon reading the present specification, providing a database, cache, or other storage mechanism for recording and tracking users' activity levels (e.g., frequency of play) based on game play, or a particular game, may be desired in some embodiments to ensure that identical or substantially similar notifications are not repeatedly generated for highly active users who repeatedly appear on activity updates. This may be beneficial in situations where recipients of such notifications value new information about previously inactive users over repeated information about highly active users.

Continuing now with FIG. 3, upon identifying one or more social network accounts, the communications module 118 can send the identity of one or more of the identified social network account(s) to the social network system 124 (step 314). For purposes of illustration, it will be assumed that the system 110 identifies the corresponding social network accounts by name in steps 312 and 314. Accordingly, in step 314, the system 110 sends the identified social network account names to the social network system 124. However, other identifiers are possible and can be sent to the social network system 124. In general, the manner in which social network accounts are identified by the system 110 can be equivalent to the identification system used by the social network system 124 for identifying its respective accounts, such that the social network account identifications sent in step 314 are in a form that is intelligible to the social network system 124.

Optionally, the step 314 of sending the one or more identified social network accounts to the social network system 124 further can include the communications module 118 additionally sending a corresponding gaming status indication for some or all of the identified social network accounts. In illustrative embodiments, a status indication accompanies each one of the social network account names that is sent to the social network in step 314. The status indications can vary based on whether the respective social network account corresponds to (a) a newly active gaming account, (b) a newly inactive gaming account, or (c) an existing active gaming account. Non-limiting and illustrative example of a status indication for a social network account that is newly active in a particular multiplayer game include the following:

"[Enter identified social network account name] is playing [Enter name of multiplayer game]."

"[Enter identified social network account name] just began playing [Enter name of multiplayer game]!"

One non-limiting and illustrative example of a status indication for social network account names that newly inactive in a particular multiplayer game is:

"[Enter identified social network account name] has stopped playing [Enter name of multiplayer game]."

Furthermore, non-limiting and illustrative example of a status indication for social network account names of users that are "existing active" users in a particular multiplayer game include:

"[Enter identified social network account name] just achieved level [enter level here] while playing [Enter name of multiplayer game]!"

"[Enter identified social network account name] is still playing [Enter name of multiplayer game]."

Furthermore, as described previously herein, the step 310 of receiving an activity update from a first gaming system 310 further can include receiving one or more indications of users' virtual locations. Optionally, this information regarding virtual locations can be stored by the system 110 (e.g., in the accounts database 112, or elsewhere), such that the system 110 maintains an up-to-date collection of active gaming users' virtual locations. This can enable the system 110 to readily access the virtual locations of active users, e.g., for creating links enabling other users to join particular multiplayer games at the specific virtual locations. Accordingly, for multiplayer games adapted for synchronous, simultaneous gameplay by multiple users, the links can enable other social network users to join their social network friends in multiplayer games at the specified virtual locations and thereby initiate synchronous, simultaneous gameplay with their social network friends.

Accordingly, the step 314 of sending the identified social network account names to the social network system 124 further can include: (a) creating a link for each of the identified social network accounts of users that are newly active in a particular multiplayer game, following the link enables users to join the particular multiplayer game at the particular specified virtual location at which the newly active user is playing the multiplayer game; and (b) sending the link to the social network system 124. Furthermore, such a link can also be created and sent to the social network system 124 for identified social network accounts of users that are "existing active" users' in a particular multiplayer game, as well as for identified social network accounts of users that are newly inactive in a particular multiplayer game. In the case of users that are newly inactive in a particular multiplayer game, the link can enable additional social network users to join the particular multiplayer game if the multiplayer game still exists, e.g., if there are still one or more other gaming users that remain logged into the multiplayer game. (For example, this feature could be used to enable friends on a social network to "tag out" and enter and exit the same multiplayer game at the same virtual location in shifts.)

Thus, the step 316 can include the system 110 sending any one or more of the following three pieces of information to the social network system 124: (i) one or more social network account names (or other suitable identifiers) corresponding to users that are newly active, newly inactive, and/or "existing active" users in one or more specific multiplayer games; (ii) for each of the social network account names, a status indication indicating the status of that social network user in that specific multiplayer game; and (iii) for each social network account name, a link that, when clicked, allows additional users to join that specific multiplayer game at the particular specified virtual location.

Step 314 of sending the identified social network accounts to the social network system 124 (which optionally can be accompanied by a corresponding status indication and/or link to join the multiplayer game at the particular virtual location) can cause the social network system 124 to display one or more notifications (step 316). For example, the notifications displayed by the social network system 124 can include a visual, audio, and/or other type of presentation of any one or more of the pieces of information (i), (ii), and/or (iii) sent by the system 110 and received by the social network system 124 in step 314. Thus, for example, the one or more notifications caused to be displayed in step 316 can indicate that a particular social network user is playing, is newly playing, is still playing, has achieved a particular level or otherwise moved to a different virtual location, or is not playing (e.g., no longer playing) a particular multiplayer game.

In illustrative embodiments, the step 314 of sending information to the social network system 124 automatically causes generation of one or more notifications to be displayed in step 316.

In illustrative embodiments, for a social network user that is newly active in a particular multiplayer game, the one or more notifications include: (a) a status indication that one or more social network users are newly active in a particular multiplayer game; (b) an indication of the particular multiplayer game that the one or more social network users have joined and (c) a link that, when clicked, allows a social network user viewing the notification to join the particular displayed multiplayer game at the particular virtual location. In further illustrative embodiments, each notification is presented to a social network user on one or more electronic displays that are only accessible through that social network user's particular social network account.

In illustrative embodiments provided herein, notifications identify social network users (e.g., as being newly active, newly inactive, or "existing active" users) according to their social network account names. Thus, if a notification about a first social network user who is newly active in a particular multiplayer game is displayed to a second social network user, then the second social network user can immediately know and understand to whom the notification refers. Thus, in such illustrative embodiment, the notifications refer to users by their social network account names rather than by their gaming account names. Accordingly, the notifications caused to be displayed by embodiments of the present invention enable gaming users to identify and "connect" with one another on a social network without any knowledge of each others' gaming account names.

Notifications can be displayed to social network users as is conventionally performed in the art. For instance, notifications can be displayed based on friendship connections, etc. Furthermore, one of skill in the art will appreciate a wide vary of ways to aggregate and amalgamate notifications such that social network users are presented with indications that numerous of their friends are all in the same multiplayer game (e.g., are all at the same virtual location). Known notification generation and delivery methods can be utilized in conjunction with embodiments of the present invention.

Figure 6:
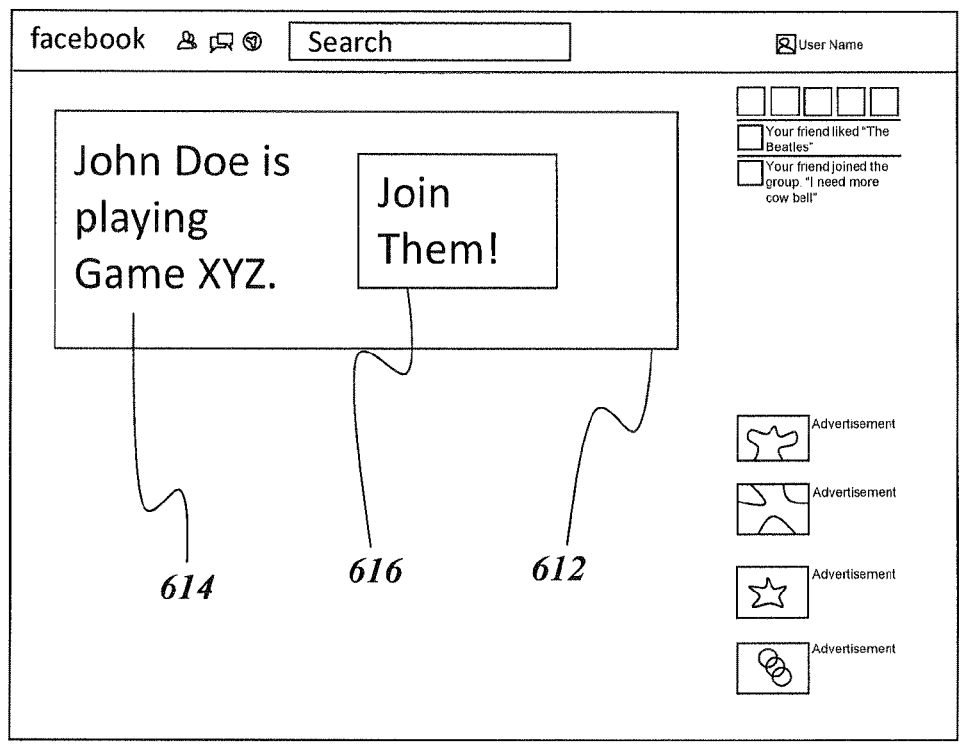
FIG. 6 is a diagrammatic illustration of an example screen shot of a notification, according to one embodiment of the present invention.
Figure 7A:
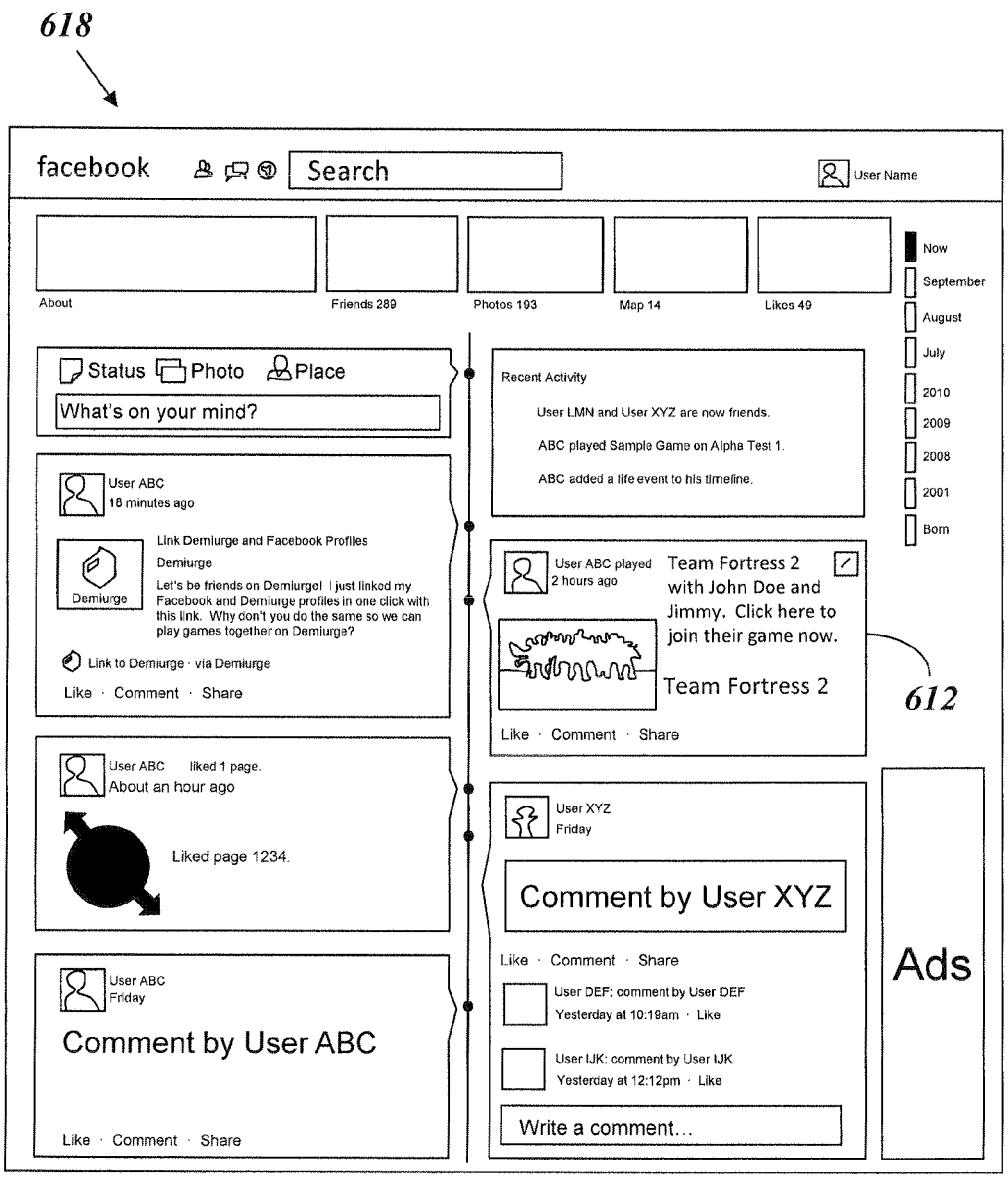
FIG. 7A is a diagrammatic illustration of an example screen shot of a notification included in a news feed, according to another embodiment of the present invention.
Figure 7B:
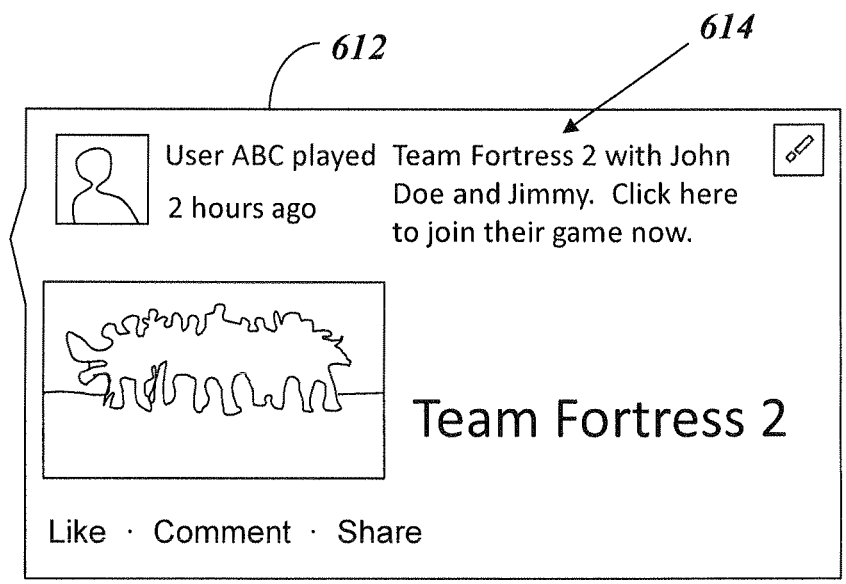
FIG. 7B is a diagrammatic illustration of an example screen shot of the notification of FIG. 7A, according to aspects of the present invention.

For example, FIG. 6 depicts a screen shot of an example Facebook® web page 610 presenting a notification 612 that includes an indication 614 that a friend ("John Doe") is playing a particular game ("Game XYZ"). FIGS. 7A and 7B depict another example notification 612 according to embodiments of the present invention. FIG. 7A depicts a screen shot of the notification 612 within an example Facebook® (or alternatively another social network website) news feed web page 618. FIG. 7B depicts an enlarged and isolated screen shot of the notification 612 of FIG. 7A. The notification 612 includes one or more indications 614 that one or more retrieved social network account names are currently playing a particular multiplayer game (e.g., "Team Fortress 2"). In particular, the notification 612 includes three retrieved social network account names ("User ABC," "John Doe," and "Jimmy Bob").

Accordingly, the social network system 124 can be configured to aggregate and consolidate notifications so as to provide a single notification including one or more indications that multiple of the retrieved user accounts—all of which can be associated with (e.g., friends with or otherwise linked or connected to) the social network user viewing the notification—are currently playing a particular multiplayer game together at the same virtual location.

Figure 4A:
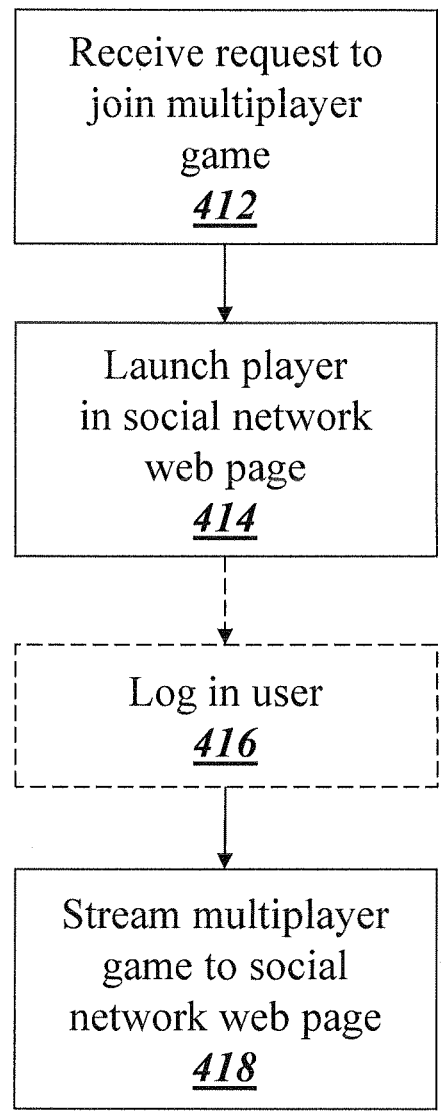
FIG. 4A is a flow chart depicting an example method for streaming a multiplayer game to a social network web page, according to aspects of the present invention.

Accordingly, as described herein, notifications (e.g., notifications pertaining to newly active users or existing active users) can include links, and the links can enable social network users viewing the notification to join the social network user(s) displayed in the notification in the displayed multiplayer game at the particular virtual location where the multiplayer game is being played. For instance, FIG. 4A depicts a flow chart of an example embodiment of a method for enabling a social network user viewing a given notification to join a multiplayer game displayed in the given notification. The social network user that is a recipient of the notification (e.g., herein referred to as the "recipient social network user") can click on or otherwise choose to follow the link included in the notification. In response to clicking on the link, the communications module 118 receives a request from the recipient social network user to join the multiplayer game at the specified virtual location (step 412). Based on the received request, the communications module 118 can cause the player module 114 to launch, for example, within the social network web page currently being viewed by the recipient social network user who has clicked on the link displayed in the notification (step 414). Once launched, the player module 114 can begin streaming the multiplayer game to the recipient social network user on the social network web page, thereby enabling the recipient social network user to join and begin playing the particular multiplayer game at the specified virtual location.

Figure 4B:
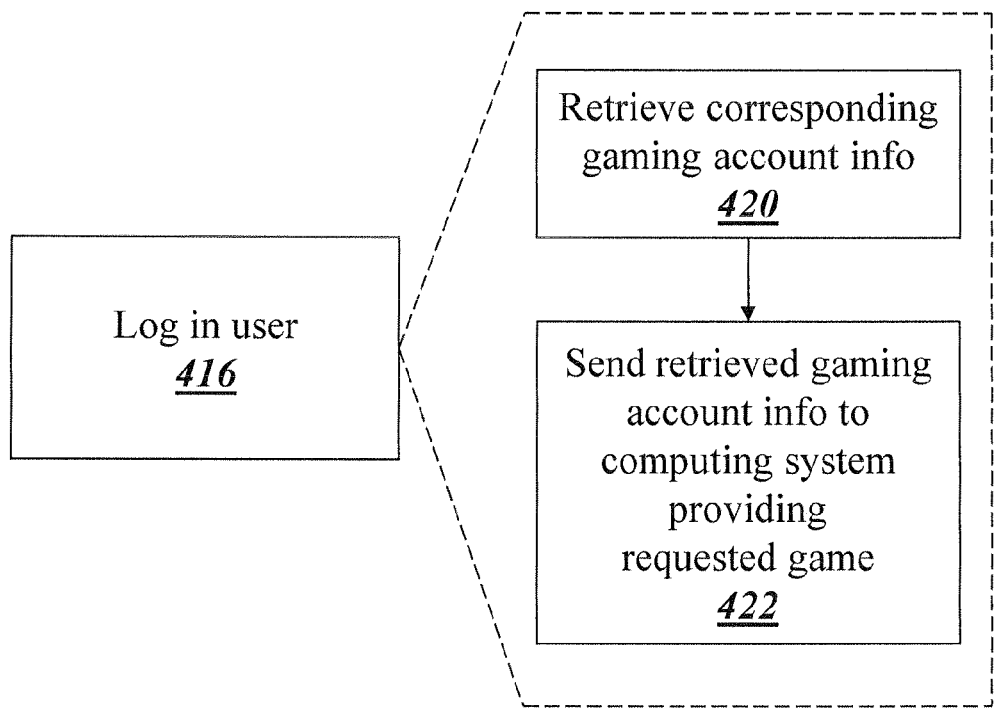
FIG. 4B is a flow chart depicting an example method for logging a social network user into a multiplayer game, according to aspects of the present invention.

In addition, in some embodiments, the system 110 can be configured to log such recipient social network users into their gaming accounts (step 416) prior to, simultaneously with, or subsequent to the step 414 of launching the player module 114. For example, FIG. 4B depicts one example method for logging in a particular recipient social network user who has clicked on a link displayed in a notification. The tracker module 116 retrieves, from the accounts database 112, gaming account information corresponding to the recipient social network user and corresponding to the particular multiplayer game for which play has been requested (step 420). In such embodiments, the accounts database 112 further can include password information, and other similar information that may be required to log a user into a gaming account. Alternatively, this information can be stored in another database. Once retrieved, the requisite gaming account information can be sent by the communications module 118 to the gaming system 122 that hosts the multiplayer game that the recipient social network user has requested to join (step 422). For instance, the retrieved gaming account information can be submitted using conventional log-in and/or authentication and/or verification web pages.

Figure 5A:
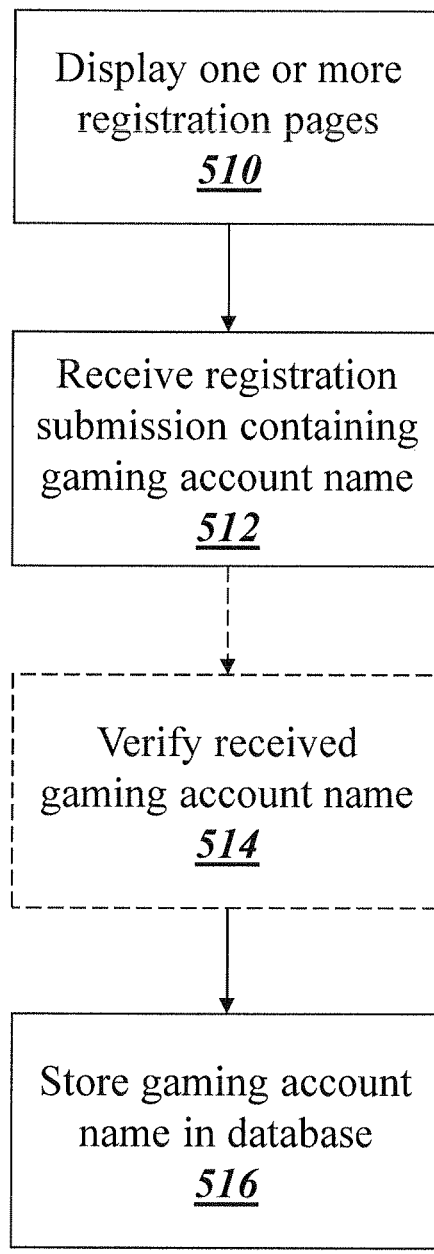
FIG. 5A is a flow chart depicting an example method for storing gaming account information in an accounts database, according to aspects of the present invention.
Figure 8:
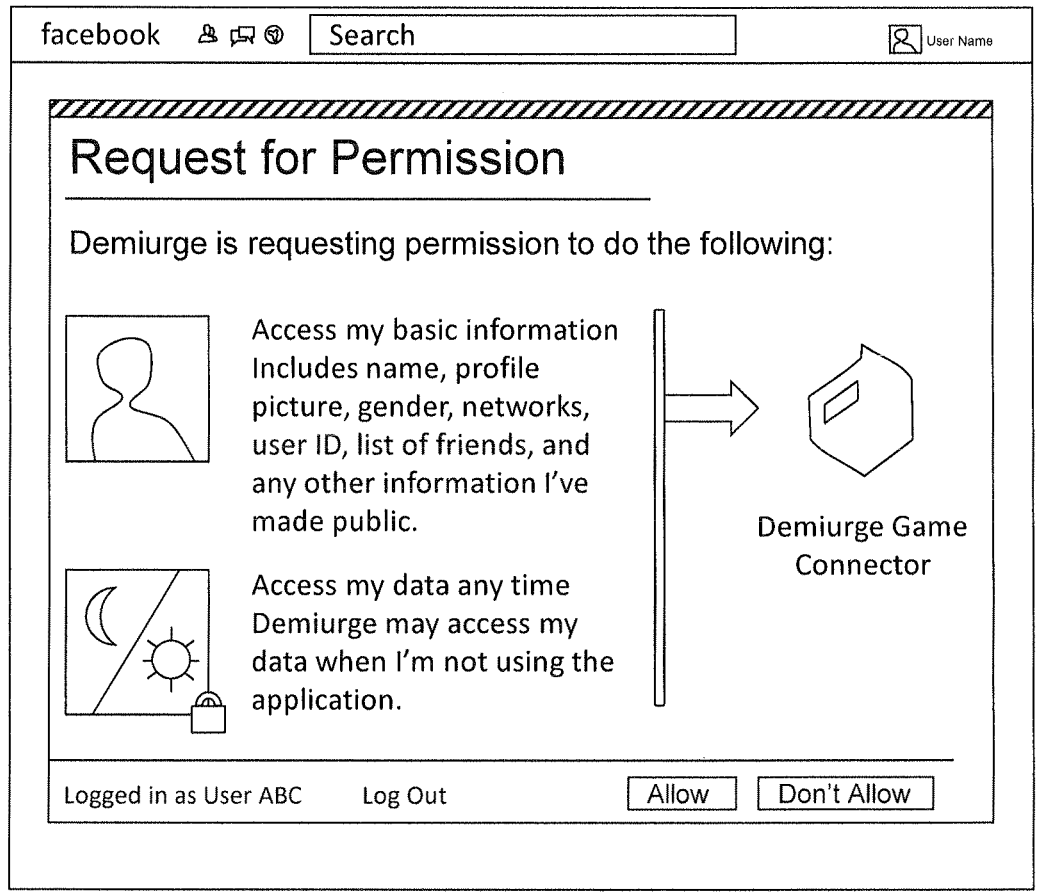
FIG. 8 is a diagrammatic illustration of an example screen shot of a first registration display, according to aspects of the present invention.
Figure 9:
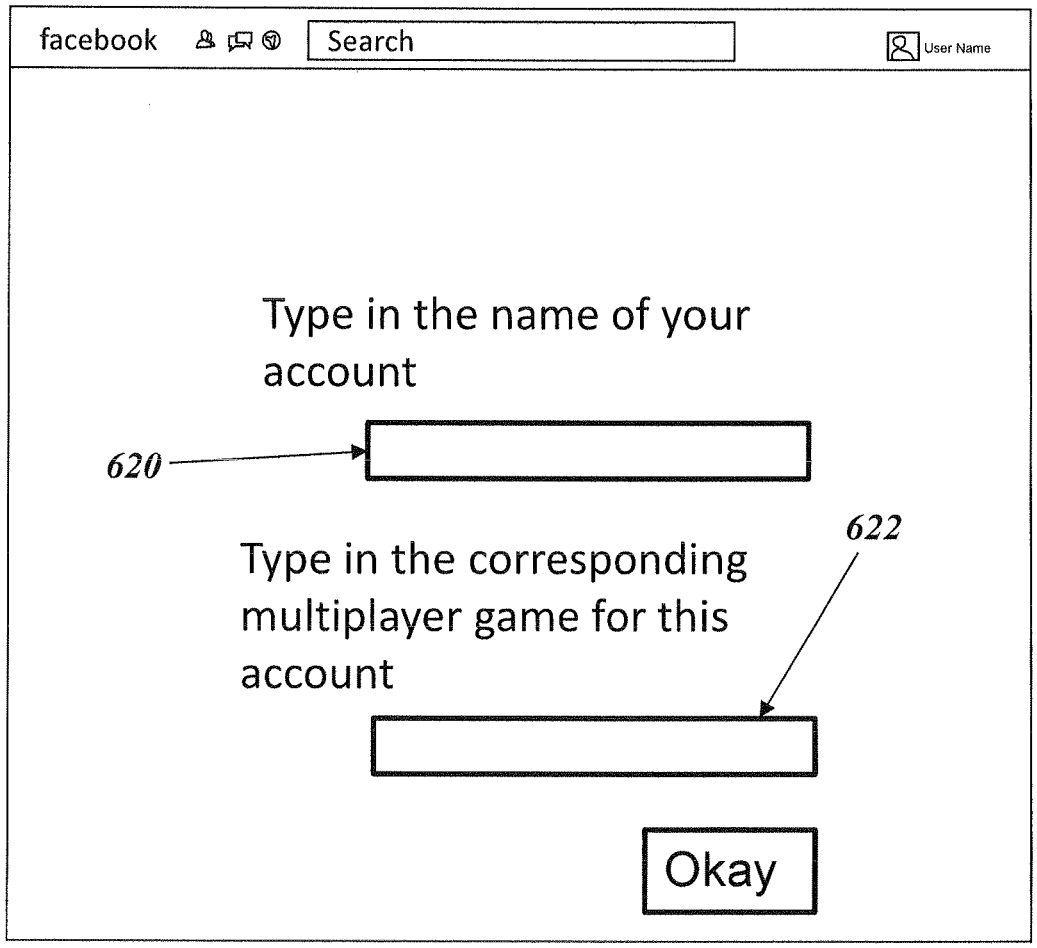
FIG. 9 is a diagrammatic illustration of an example screen shot of a second registration display, according to aspects of the present invention.

In addition, the system 110 further can provide one or more features enabling social network users to register their social network user accounts with the system 110, e.g., thus enabling creation of notifications about their own gaming activity, and thus enabling the accounts database 112 to effectively link their social network accounts with one or more submitted/registered gaming accounts. For example, the FIG. 5A depicts one method for registering a social network account with the system 110 according to an example embodiment of the present invention. The social network system 124 can present one or more registration fields on one or more displays, e.g., on one or more web pages accessible to the user through the user's corresponding social network account (step 510). One example of a first registration display (e.g., social network web page) is depicted in FIG. 8, which illustrates a conventional Facebook® app registration page, adapted to display a request for the system 110 ("Demiurge Game Connector") to access the user's social network account information (e.g., friend lists, activity information, etc.). Furthermore, one or more additional registration displays 624 (e.g., web page, as depicted in FIG. 9) can be provided, to collect additional information from the user. As illustrated in FIG. 9, a registration form can be presented containing one or more entry fields. For instance, the depicted registration form includes a first entry field 620 where a user enters a particular gaming account name, and a second entry field 622 where the user enters a corresponding multiplayer game. In some alternative embodiments, the second entry field 622 is not included in the display, but rather is selected by the user in a previous screen, etc.

Continuing with FIG. 5A, the social network system 124 can receive, from a particular social network account, a registration submission containing gaming information that includes at least a gaming account name and a corresponding game or gaming system 122. The social network system 124 can automatically send the received gaming information and the account name of the user who submitted to the registration form to the system 110. The received gaming information, including the gaming account name and the social network account name of the user who submitted the registration form, can be automatically stored by the system 110 in the accounts database 112, thereby effectively "linking" the user's social network account with the user's submitted gaming account(s).

Figure 5B:
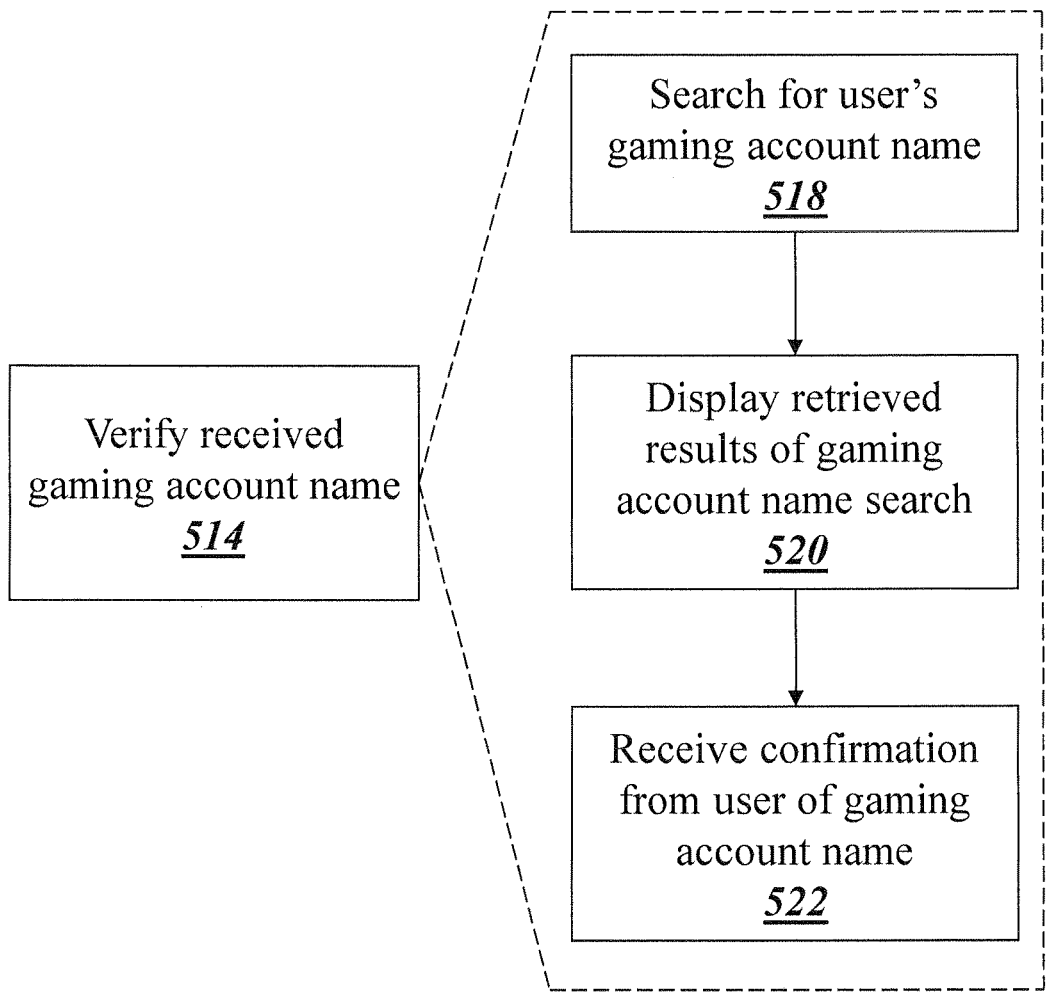
FIG. 5B is a flow chart depicting an example method for verifying gaming account information, according to aspects of the present invention.
Figure 10:
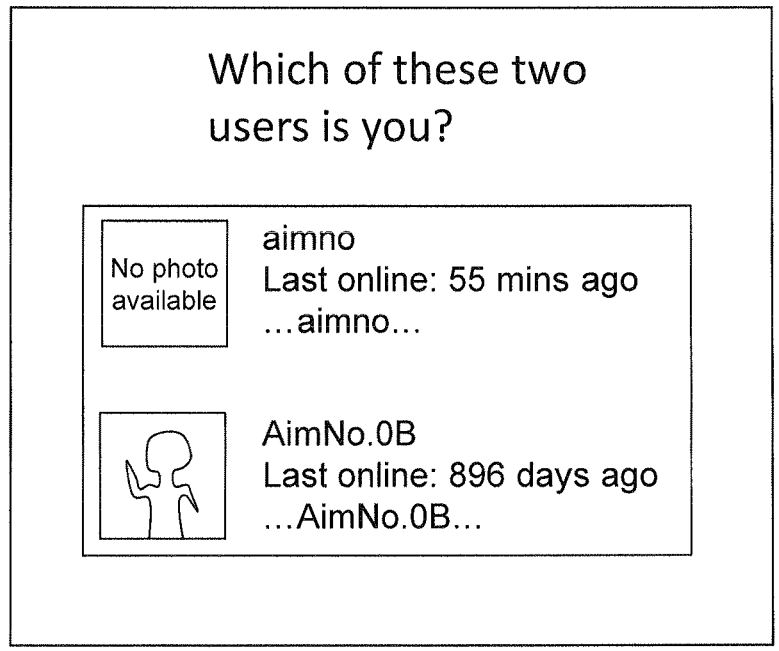
FIG. 10 is a diagrammatic illustration of an example screen shot of a gaming account verification display, according to aspects of the present invention.

Users can be requested to verify some or all of the received gaming account information prior to the system 110 storing the information in the accounts database 112. For example, in some illustrative embodiments, users are requested to verify the submitted gaming account name (step 514). FIG. 5B depicts one method for performing the step 514 of verifying the submitted gaming account name, according to an example embodiment of the present invention. In particular, the communications module 118 can automatically submit, to the appropriate gaming system 122, the account name submitted by the user (e.g., as entered in the first entry field 620). This can cause the gaming system 122 to search for matches with the submitted gaming account name (step 518), e.g., by automatically searching one or more databases hosted by the gaming system 122. The communications module 118 can receive the results returned from the search and can cause these results to be presented to the social network user in one or more displays accessible through the social network user's social network account (step 520). One example of such a display (e.g., web page) is depicted in FIG. 10. In the example screen shot of FIG. 10, two search results are displayed to the social network user. The display includes a message or indication requesting the social network user to select and submit which of the two results is the social network user's actual gaming account name. Referring again to FIG. 5B, the communications module 118 can receive a submission of a selection of one of the displayed search results from the social network user, thereby confirming one of the displayed results as being the social network user's actual gaming account name (step 522).

Accordingly, in this manner, the accounts database 112 can be created by repeating the methods of FIGS. 5A and 5B for each new user requesting to link his/her social network account with one or more gaming accounts. Alternatively, such databases can be previously created (e.g., by third party information mining companies) and made available in a form accessible to the system 110.

The registration displays (e.g., as depicted in the examples of FIGS. 8 through 10) can be presented to social network users at any number of different times. For example, if a social network user is viewing a notification but the social network user has not provided permission for the application to access the user's information, then the registration display of FIG. 8 can be presented to the social network user upon the social network user clicking on a link in the notification to join the particular multiplayer game mentioned in the notification. Then, upon the social network user completing the registration display of FIG. 8, the registration displays of FIGS. 9 and 10 can be presented in succession. Once submitting the information requested by the registration displays of FIGS. 8 through 10, the social network user can be caused to join the requested multiplayer game. As another possibility, if a particular social network user who is viewing a given notification has granted permission for the application to access the user's information but has not yet provided the system 110 with any of his or her corresponding gaming account names or information, then the user clicking a link in the notification can result in the user being presented with the registration display of FIG. 9. Furthermore, other registration procedures and presentations are possible. One of skill in the art will appreciate a number of other instances and opportunities to present one or more registration displays upon reading the present invention. All such embodiments are contemplated within the scope of the present invention. Moreover, the displays presented in the example embodiments of FIGS. 8 through 10 are illustrative and in no way limit the present invention. A wide variety of other suitable displays and registration forms will be contemplated by one of skill in the art upon reading the present specification. All such alternatives and modifications are contemplated within the scope of the present invention.

Figure 11:
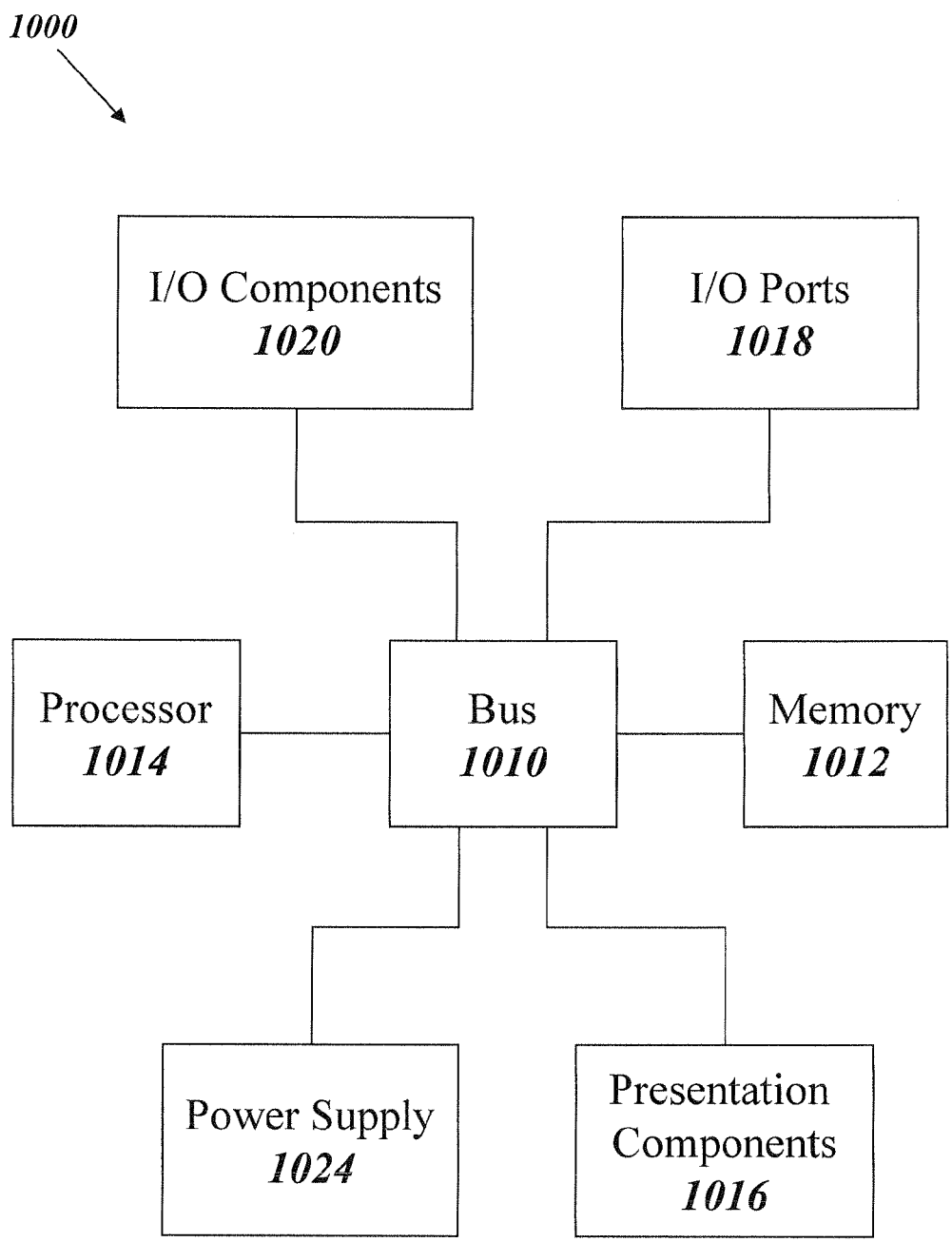
FIG. 11 is a diagrammatic illustration of an example computing environment for implementing the system of FIG. 1, according to embodiments of the present invention.

FIG. 11 illustrates an example computing device 1000 within an illustrative operating environment for implementing illustrative methods and systems of the present invention. The computing device 1000 is merely an illustrative example of a suitable computing environment and in no way limits the scope of the present invention. A "computing device," as represented by FIG. 11, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways in order to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 11 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, or the like. The computing device 1000 can include one or more processors that read data from components such as the memory 1012, the various I/O components 1016, etc. Presentation component(s) 1016 present data indications to a user or other device. Exemplary presentation components include a display device, speaker, printing component, vibrating component, etc.

The I/O ports 1018 can allow the computing device 1000 to be logically coupled to other devices, such as I/O components 1020. Some of the I/O components 1020 can be built into the computing device 1000. Examples of such I/O components 1020 include a microphone, joystick, recording device, game pad, satellite dish, scanner, printer, wireless device, networking device, or the like.

Although the illustrative embodiments provided herein are described with reference to providing notifications regarding newly active or newly inactive gaming accounts, one of skill in the art will appreciate upon reading the present specification that in other embodiments, notifications can include information about the activity of existing users. For instance, notifications can include one or more indications that a particular user has achieved a new level, mastered a particular stage, and the like.

Furthermore, although embodiments of the present invention have been described as configured for implementation by a single social network system 124, embodiments of the present invention can be configured for implementation by more than one social network system 124. For example, numerous different social network systems 124 can utilize the system 110 as described herein to provide substantially the same service and functionality for its users. Accordingly, in such implementations, the system 110 will be configured with functionality that informs a first social network's users who participate in multiplayer games of each others' gaming activity, and will simultaneously provide functionality that informs a second social network's users who participate in multiplayer games of each others' gaming activity. One of skill in the art will appreciate a number of different ways to enable efficient storage, retrieval, and utilization of information pertaining to numerous different social network systems 124. For example, to minimize redundancy of such implementations, the accounts database 112 can include additional entries pertaining to additional social network account names (or other related social network account information). Thus, in this manner, the system 110 can be configured to enable users that input gaming information on a first social network to allow notifications about the user's gaming activity to be created and published in one or more displays accessible through a second social network within which the user is a member. As an alternative, the accounts database 112 can be implemented by several different databases, each of which can correspond to a particular social network system 124. One of skill in the art will appreciate yet further ways to implement such embodiments adapted for providing user connection service to numerous different social network systems 124. All such alternatives and modifications are contemplated within the scope of the present invention.

It should be noted that a notification can be any visual, audio, textual, graphical, or other presentation of information. As illustrative examples, a notification can include a push notification, a non-push notification, a pop-up notification, an alert, an entry in a news feed, an entry in a timeline, a message (e.g., email message), an instant message, or any other notification. One of skill in the art will appreciate a wide variety of different notifications suitable for implementation with embodiments of the present invention.

Notably, illustrative embodiments of the present invention described herein can allow users to effectively "link" their social network accounts with their multiplayer gaming accounts, even when such multiplayer gaming accounts are hosted by (e.g., third-party) gaming systems that are independent of the social network system. Stated differently, each user is enabled to "link" his or her social network user account with his or her gaming user account, even though they are two different accounts. (More specifically, the social network user account and the gaming user account are un-affiliated, e.g., separate and distinct.) This improved connectivity between disparate social networks and gaming networks can provide users with the ability to easily share information about their gaming activity with their social network friends, e.g., without requiring users to inform the social network system of their friends' gaming user account names. Additionally, in some further embodiments, users are enabled to join their friends in multiplayer games (e.g., multiplayer games adapted for synchronous, simultaneous gameplay by multiple users) within the environment of the social network. For example, social network notifications can be caused to be presented to users via their social network accounts, and the social network notifications can include a link that, when clicked, allows the user clicking the link to launch the player module 114 and begin streaming the game in the social network website (e.g., in the social network web page currently being displayed). Accordingly, in addition to providing convenient transmission and dissemination of social network users' gaming activity/information, embodiments of the present invention also allow users to more easily join one another in multiplayer games. Upon reading the present specification, one of skill in the art will appreciate yet other benefits of and problems solved by embodiments of the present invention.

Numerous modifications and alternative embodiments of the present invention will be apparent to those of skill in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer implemented method, comprising:
   receiving, through at least one input device, an indication of an activity by a first user on a first gaming user account of a first computer implemented gaming system;
   sending a communication to a computer implemented social network system separate from the first computer implemented gaming system, causing the computer implemented social network system to display a notification based on the indication of the activity by the first user in the first computer implemented gaming system;
   wherein the communication includes information enabling the computer implemented social network system to affiliate the indication of the activity by the first user with a first social network user account of the computer implemented social network system, the first social network user account belonging to the first user;
   wherein the first gaming user account and the first social network user account are un-affiliated different user accounts such that the first gaming user account is separate and distinct from the first social network user account;

wherein the activity by the first user comprises joining a multiplayer game or moving to a different virtual location, and wherein the method further comprises:
receiving from the computer implemented gaming system, through at least one input device, a first virtual location of the first user on the first gaming user account; and
generating a link enabling an additional user to join the multiplayer game at the first virtual location; and wherein the communication to the computer implemented social network system further causes the notification to include the link.

2. The computer implemented method of claim 1, wherein the activity by the first user comprises one or more of: joining a multiplayer game, exiting a multiplayer game, or moving to a different virtual location in a multiplayer game.

3. The computer implemented method of claim 1, further comprising:
receiving a request submitted by a second user viewing the notification on a second social network user account belonging to the second user to join the multiplayer game at the first virtual location; and
causing an application to launch in a website hosted by the computer implemented social network system, the application enabling the second user to join the multiplayer game at the first virtual location by accessing one or more websites hosted by the computer implemented gaming system.

4. The computer implemented method of claim 3, wherein the application streams one or more multiplayer games hosted by the computer implemented gaming system to the website hosted by the computer implemented social network system.

5. The computer implemented method of claim 1, further comprising:
identifying, based on the received activity indication, the first social network user account prior to the step of sending the communication.

6. The computer implemented method of claim 5, wherein the first social network user account belonging to the first user is identified by a social network user account name, a user ID, or a user authentication tag.

7. The computer implemented method of claim 5, wherein the step of identifying the first social network user account comprises: retrieving the first social network user account from at least one database, wherein the at least one database contains, for each user of a plurality of users, a social network user account belonging to the user and at least one gaming user account belonging to the user, and further wherein the plurality of users includes the first user.

8. The computer implemented method of claim 1, further comprising receiving a corresponding gaming user account name from each of one or more users on one or more corresponding social network user accounts, and storing the corresponding gaming user account name for each of the one or more users in a database.

9. The computer implemented method of claim 1, wherein the notification is displayed to a second user on a second social network user account belonging to the second user, wherein the first user and the second user are linked as social network friends in the computer implemented social network system.

10. A non-transitory computer readable storage device containing instructions stored thereon, wherein execution of the instructions by at least one processor causes a method to occur, the method comprising:
sending a communication to a computer implemented social network system causing the computer implemented social network system to display a notification, wherein the step of sending the communication is based on an indication of an activity by a first gaming user account associated with a first user in a first computer implemented gaming system separate from the computer implemented social network system, the indication being received by the first computer implemented gaming system;

wherein the communication includes information enabling the computer implemented social network system to affiliate the indication of the activity by the first user with a first social network user account of the computer implemented social network system, the first social network user account belonging to the first user;

wherein the first gaming user account and the first social network user account are un-affiliated different user accounts such that the first gaming user account is separate and distinct from the first social network user account;

wherein the activity by the first user comprises joining a multiplayer game or moving to a different virtual location, and wherein the method further comprises:
receiving from the computer implemented gaming system, through at least one input device, a first virtual location of the first user on the first gaming user account; and
generating a link enabling an additional user to join the multiplayer game at the first virtual location; and wherein the communication to the computer implemented social network system further causes the notification to include the link.

11. A computer implemented system comprising at least one processor, at least one output device, at least one input device, and at least one non-transitory computer readable storage device, wherein the computer implemented system is configured to perform a method, the method comprising:
receiving, through the at least one input device, an indication of an activity by a first user on a first gaming user account of a first computer implemented gaming system;
based on the indication of the activity by the first user in the first computer implemented gaming system, causing the at least one processor to execute one or more instructions stored on the at least one non-transitory computer readable storage device, thereby causing a communication to be sent through the at least one output device to a computer implemented social network system separate from the first computer implemented gaming system, causing the computer implemented social network system to display a notification;

wherein the communication includes information enabling the computer implemented social network system to affiliate the indication of the activity by the first user with a first social network user account of the computer implemented social network system, the first social network user account belonging to the first user;

wherein the first gaming user account and the first social network user account are un-affiliated different user accounts such that the first gaming user account is separate and distinct from the first social network user account;

wherein the activity by the first user comprises joining a multiplayer game or moving to a different virtual location, and wherein the method further comprises:
- receiving from the computer implemented gaming system, through at least one input device, a first virtual location of the first user on the first gaming user account; and
- generating a link enabling an additional user to join the multiplayer game at the first virtual location; and
- wherein the communication to the computer implemented social network system further causes the notification to include the link.

12. The computer implemented system of claim 11, wherein the activity by the first user comprises one or more of: joining a multiplayer game, exiting a multiplayer game, or moving to a different virtual location in a multiplayer game.

13. The computer implemented system of claim 11, wherein the method further comprises:
- receiving a request submitted by a second user viewing the notification on a second social network user account belonging to the second user to join the multiplayer game at the first virtual location; and
- causing an application to launch in a website hosted by the computer implemented social network system, the application enabling the second user to join the multiplayer game at the first virtual location by accessing one or more websites hosted by the computer implemented gaming system.

14. The computer implemented system of claim 13, wherein the application is configured to stream, using the at least one processor, one or more multiplayer games hosted by the computer implemented gaming system to the website hosted by the computer implemented social network system.

15. The computer implemented system of claim 11, wherein the method further comprises identifying, based on the received activity indication, the first social network user account prior to the step of sending the communication.

16. The computer implemented system of claim 15, wherein the computer implemented system is configured to identify the first social network user account belonging to the first user by a social network user account name, a user ID, or a user authentication tag.

17. The computer implemented system of claim 15, wherein the step of identifying the first social network user account comprises retrieving the first social network user account from at least one database, wherein the at least one database contains, for each user of a plurality of users, a social network user account belonging to the user and at least one gaming user account belonging to the user, and further wherein the plurality of users includes the first user.

18. The computer implemented system of claim 11, wherein the method further comprises receiving a corresponding gaming user account name from each of one or more users on one or more corresponding social network user accounts, and storing the corresponding gaming user account name for each of the one or more users in a database.

* * * * *